US005635824A

United States Patent [19]
Noguchi

[11] Patent Number: 5,635,824
[45] Date of Patent: Jun. 3, 1997

[54] POWER SUPPLYING CIRCUIT

[75] Inventor: Yasunori Noguchi, Kyoto, Japan

[73] Assignee: Rohm Co., Ltd., Kyoto, Japan

[21] Appl. No.: 421,884

[22] Filed: Apr. 14, 1995

[30] Foreign Application Priority Data

Apr. 14, 1994 [JP] Japan ................... 6-075552

[51] Int. Cl.⁶ ................... G05F 1/40; H02H 7/10
[52] U.S. Cl. ................... 323/284; 363/50
[58] Field of Search ................... 323/284, 317, 323/364, 367; 363/50, 74

[56] References Cited

U.S. PATENT DOCUMENTS

| | | | |
|---|---|---|---|
| 4,220,905 | 9/1980 | Quarton | 320/39 |
| 4,849,683 | 7/1989 | Flolid | 323/284 |
| 4,962,350 | 10/1990 | Fukuda | 323/284 |

*Primary Examiner*—Stuart N. Hecker
*Attorney, Agent, or Firm*—Nikaido, Marmelstein, Murray & Oram LLP

[57] ABSTRACT

A switch is connected between an input terminal and an output terminal. A determining circuit detects the voltage of the output terminal to determine whether or not the voltage of the output terminal is a predetermined voltage or lower. The determining circuit generates an output for turning off the switch when the voltage of the output terminal is a predetermined voltage or lower and for turning on the switch when the voltage is higher than the predetermined voltage. An impedance line is provided which is connected to the input terminal and to the output terminal so as to bypass the switch. When a supply of the power is cut off by the switch, a current flows from the input terminal to a load apparatus through the impedance line and the output terminal.

4 Claims, 3 Drawing Sheets

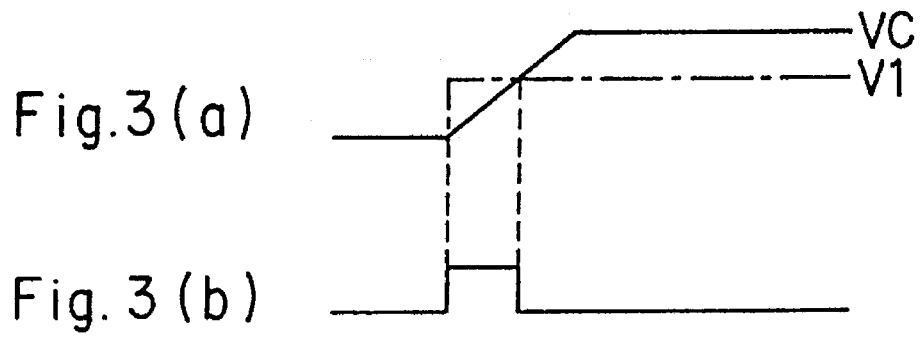
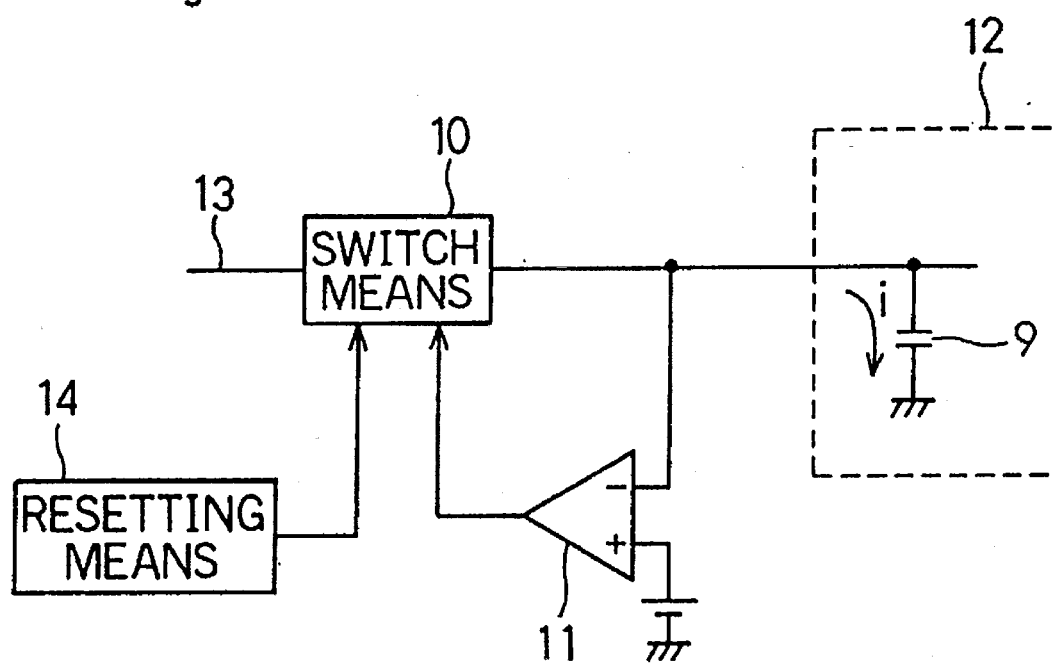

POWER SUPPLYING CIRCUIT

BACKGROUND OF THE INVENTION

1. Field of the Invention

The present invention relates to a power supplying circuit which supplies the supply voltage from a power source circuit to a load apparatus. The power supplying circuit of the present invention is suitable for use, for example, in power supply to an external accessory of a video tape recorder incorporating a camera and in driving of a battery charger and a motor.

2. Description of the Prior Art

Conventionally, in supplying the supply voltage from a power source circuit to a load apparatus, a protecting circuit part such as a fuse (an integrated circuit (IC) protector when the load apparatus is an IC) is provided between the power source circuit and the load apparatus. When the power supply is abnormal, the power supply to the load apparatus is stopped by breaking the protecting circuit part such as a fuse and an IC protector.

For example, when the supply voltage is supplied from a power source circuit of a video tape recorder incorporating a camera to a zoom microphone which is an external accessory of the video tape recorder, if the amount of current flowing to the zoom microphone increases due to a disorder such as a short circuit, a fuse provided in the video tape recorder incorporating a camera breaks to stop the power supply.

However, in the conventional power supplying circuit of such an arrangement, since the protecting circuit part such as a fuse and an IC protector breaks when the power supply is abnormal, once the power supply is stopped by the working of the protecting circuit part, the power supplying state can be restored without the protecting circuit part being replaced. Thus, it requires a long time to resume the power supply.

To solve this problem, an arrangement as shown in FIG. 4 is considered in which a means 11 is provided for monitoring the voltage supplied to a load apparatus 12, and when the supply voltage becomes a predetermined value or lower, a switch means 10 inserted in a power supplying circuit 13 is broken to stop the power supply. To resume the power supply, the switch means 10 is reset by a manually operated resetting means 14.

However, according to this method, since the stop of the power supply is executed based on the drop of the supply voltage, the power supply is stopped even by an instantaneous rush current, and the power is not supplied until the switch means 10 is reset. For example, in the case of the video tape recorder incorporating a camera, an accessory is attachable to its body and the accessory has a supply terminal for receiving power so that power is supplied from the video tape recorder to the accessory. When the accessory is connected some time after the video tape recorder is turned on, a rush current i is generated to charge a decoupling capacitor (electrolytic capacitor) 9 of the accessory to break the switch means 10. Then, no power is supplied to the accessory until the resetting means 14 is operated.

SUMMARY OF THE INVENTION

An object of the present invention is to provide a power supplying circuit which surely provides protection against abnormal power supply and that automatically restores a power supplying state even if a switch means is broken by the generation of a rush current generated in charging a decoupling capacitor of a load apparatus.

A power supplying circuit of the present invention is provided with the following: an input terminal for inputting a power; an output terminal for outputting the power; a switch means connected between the input terminal and the output terminal; a determining circuit which detects a voltage of the output terminal to determine whether or not the voltage of the output terminal is a predetermined voltage or lower, said determining circuit generating an output for turning off the switch means when the voltage of the output terminal is the predetermined voltage or lower and turning on the switch means when the voltage is higher the predetermined voltage; and an impedance line connected to the input terminal and to the output terminal so as to bypass the switch, said impedance line supplying a power supply current through the output terminal to a load apparatus connected to the output terminal when the power is cut off by the switch.

According to such features, when the determining means determines that the supply voltage is the predetermined voltage or lower because of an abnormal power supply, the power supply to the load apparatus is stopped by the switch means. Thereafter, by performing a power activating operation at the power source circuit, the state where the power is supplied to the load apparatus by the switching means is restored by an operation of a restoring means.

However, when the switch means is broken by a rush current generated in charging the decoupling capacitor of the load apparatus, the current flows to the capacitor through the impedance line even after the breakage of the switch means to charge the capacitor, so that the supply voltage is the predetermined value or higher. As a result, the switch means is automatically brought into a power supplying state by the output of the determining means. On the contrary, when the switch means is short-circuited by an accident such as a short circuit at the load apparatus, the supply voltage is never the predetermined value or higher, so that the power supply is not automatically resumed.

BRIEF DESCRIPTION OF THE DRAWINGS

This and other objects and features of this invention will become clear from the following description, taken in conjunction with the preferred embodiments with reference to the accompanied drawings in which:

FIG. 3 is a waveform chart of assistance in explaining an operation of the embodiment of the present invention; and FIG. 4 shows a power supplying circuit of a type to which the present invention is directed.

DESCRIPTION OF THE PREFERRED EMBODIMENTS

Figure 1:
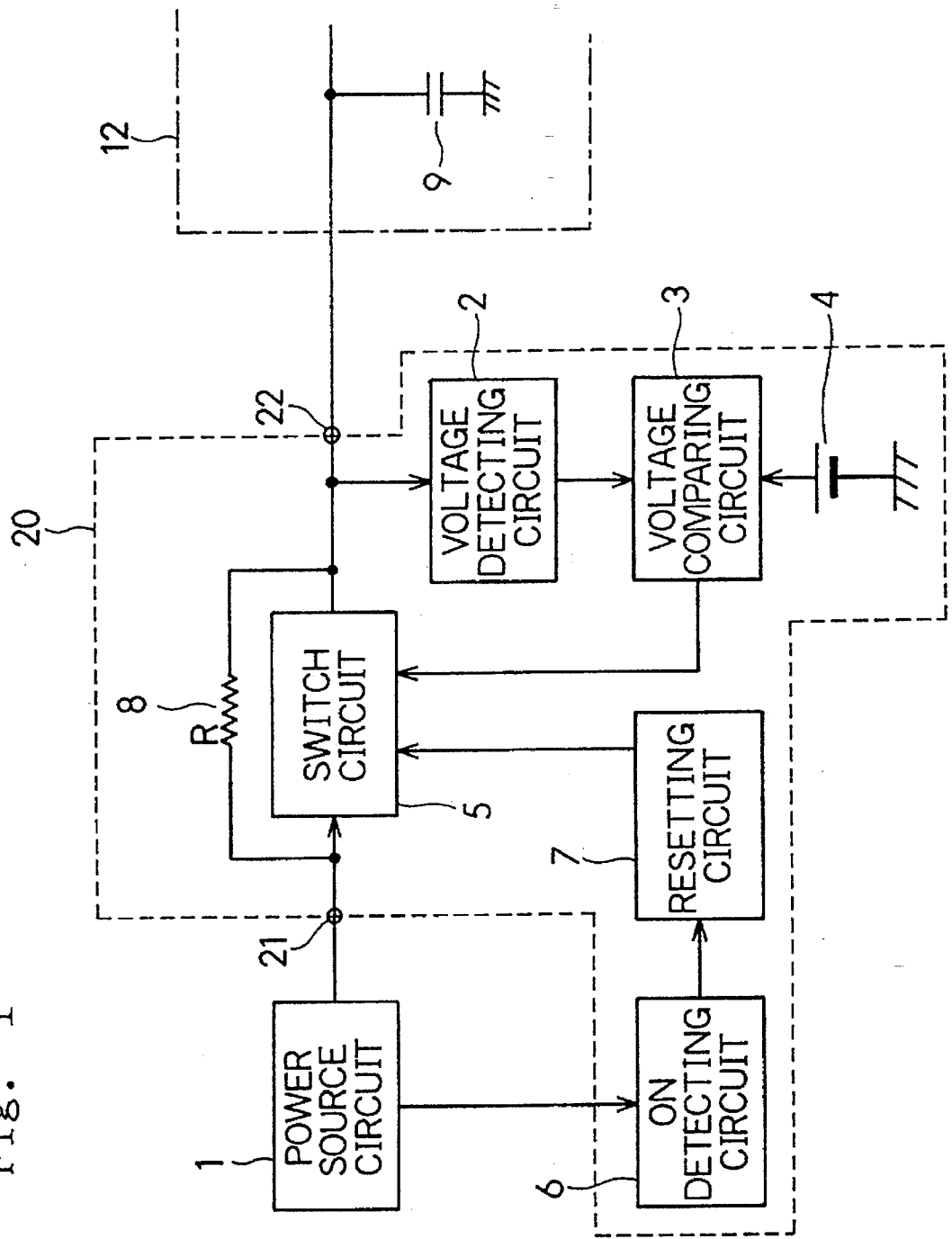
FIG. 1 shows an embodiment of the present invention.

Referring to the attached drawings, a power supplying circuit of the present invention will be described for a case where it is employed in a video tape recorder incorporating a camera which supplies power to an external accessory such as a zoom microphone. Referring to FIG. 1, the dotted enclosure shows the power supplying circuit portion 20 provided in the video tape recorder incorporating a camera. The power supplying circuit portion supplies the power from a power source circuit 1 provided in the video tape recorder incorporating a camera to a load apparatus 12. In this case, the load apparatus 12 is the external accessory. The power source circuit 1 outputs a supply voltage obtained by rectifying and smoothing the commercial power or a supply voltage from a battery. The power supplying circuit portion 20 is provided with an input terminal 21 and an output terminal 22.

Reference numeral 2 represents a voltage detecting circuit which detects the voltage of the terminal 22 which is supplied to the load apparatus 12. Reference numeral 3 represents a voltage comparing circuit which compares the detected supply voltage with a predetermined reference voltage (in this case, a voltage from a battery 4 as a reference power source) to determine whether the supply voltage is the reference voltage. When it is determined that the supply voltage is the reference voltage or lower based on the comparison result, the voltage comparing circuit 3 stops the supply of a holding current to a subsequently-described switch circuit.

Reference numeral 5 represents the switch circuit which continues or stops the power supply from the power source circuit 1 to the load apparatus 12 based on the result of the comparison by the voltage comparing circuit 3. The switch circuit 5 continues the power supplying state while a holding current is supplied from the voltage comparing circuit 3. Reference numeral 6 represents an ON detecting circuit which detects a power ON (activating) operation at the power source circuit 1. Reference numeral 7 represents a resetting circuit which supplies a reset current for a predetermined period of time to the switch circuit 5 that is in the broken state when the power ON operation is detected by the ON detecting circuit 6 to reset the broken state thereof, thereby restoring the power supplying state. Since the resetting circuit 7 is activated by the power ON operation, the resetting circuit 7 is indirectly activated based on a manual operation. The resetting circuit 7 may be activated by a direct manual operation.

When the switch circuit 5 is in the power supplying state, if the power supply is abnormal such that the amount of current flowing to the load apparatus 12 increases, for example, due to a short circuit in the load apparatus, the supply voltage detected by the power detecting circuit 2 decreases to be lower than the reference value due to the increase in current amount. Consequently, the holding current from the voltage comparing circuit 3 is stopped, so that the switch circuit 5 is broken to stop the power supply to the load apparatus 12.

After the abnormality such as a short circuit is removed at the load apparatus 12, when the power is activated at the power source circuit 1 (for example, when the power switch which has been turned on is turned off and then turned on again), the activation of the power is detected by the ON detecting circuit 6, so that a reset current is supplied from the resetting circuit 7 to the switch circuit 5 for a predetermined period of time. Consequently, the switch circuit 5 is brought into the power supplying state to resume the power supply to the load apparatus 12. The supply voltage is detected by the voltage detecting circuit 2, and when it is determined that the supply voltage is the reference voltage or higher by the voltage comparing circuit 3, the supply of the holding current is resumed while the reset current is supplied, so that the switch circuit 5 remains in the power supplying state even after the termination of the reset current supply. At this time, when it is determined that the supply voltage is lower than the reference voltage, no holding current is supplied from the voltage comparing circuit 3, so that the switch circuit 5 is again broken. Reference numeral 8 represents an impedance line connected to the power source circuit 1 and to the load apparatus 12 to bypass both ends of the switch circuit 5. In this embodiment, the impedance line 8 has a resistor R. The value of the resistor R is comparatively high. Accordingly, a current flowing through the impedance line 8 is small.

Figure 2:
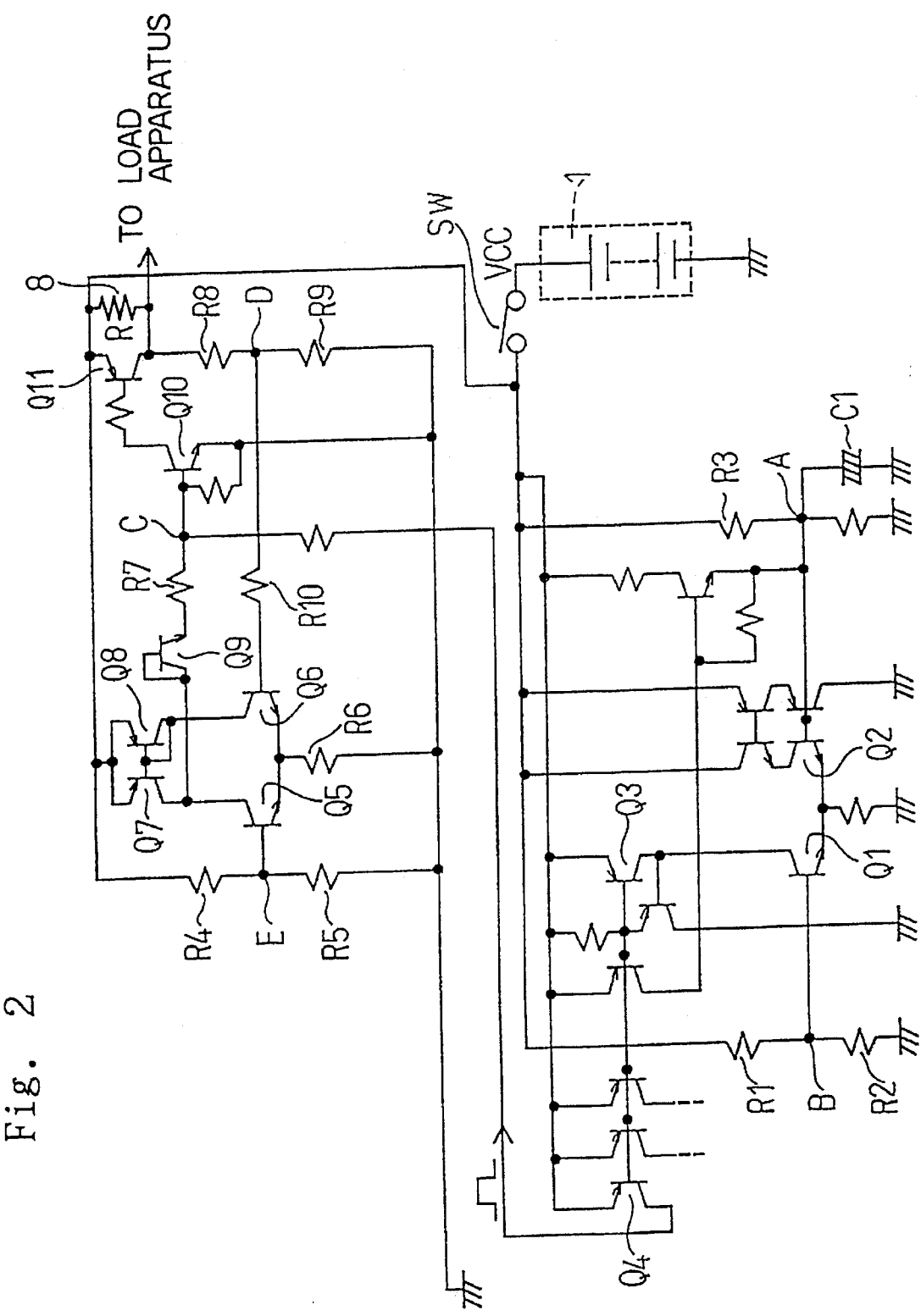
FIG. 2 shows a specific arrangement of the embodiment of the present invention.

Referring to FIG. 2, there is shown a specific arrangement of the power supplying circuit. Before a manually operable switch SW is turned on, the voltages at A and B are both 0 V. When the switch SW is turned on, a voltage V1 which is a supply voltage VCC divided by resistors R1 and R2 is generated at B. The voltage at A increases from 0 V as shown by the solid line of (a) of FIG. 3 as a capacitor C1 is gradually charged at time constants of a resistor R3 and the capacitor C1.

Since the base voltage of a transistor Q1 is higher than the base voltage of a transistor Q2 while the voltage VC at A is lower than the voltage V1 at B, the transistor Q1 is activated and the transistor Q2 is disabled. By the activation of the transistor Q1, a transistor Q3 is activated. By the activation of the transistor Q3, a transistor Q4 is activated, so that reset current flows to a node C.

However, when the voltage VC at A exceeds the voltage at B, the conditions of the transistors Q1 and Q2 are reversed so that the transistor Q1 is disabled and the transistor Q2 is activated. Consequently, the transistors Q3 and Q4 are disabled to stop the flow of the reset current from the transistor Q4 to the node C. By this operation, the reset current becomes a current of a pulse form as shown at (b) of FIG. 3.

Transistors Q5 and Q6 are differential transistors constituting a differential amplifier. To the base of the transistors Q5, a constant bias serving as a reference is applied by resistors R4 and R5. The emitters of the transistors Q5 and Q6 are connected to ground through a resistor R6. To the collectors of the transistors Q5 and Q6, transistors Q7 and Q8 are connected, respectively.

The transistors Q7 and Q8 constitute a current mirror circuit driven by a collector output of the transistor Q6. The collector of the transistor Q7 on the output side of the current mirror circuit is connected to the base of a transistor Q10 through a diode-connected transistor Q9 and a resistor R7. The collector of the transistor Q10 is connected to the base of a PNP-type feeding transistor Q11. The collector of the transistor Q11 is connected to the load apparatus 12. The collector of the transistor Q11 is also connected to ground through resistors R8 and R9. A node D between the resistors R8 and R9 is connected to the base of the differential transistor Q6 through a resistor R10.

Therefore, when the power switch SW is turned on to supply the reset current to the node C, the transistors Q10 and Q11 are activated to supply the supply voltage VCC from the collector of the transistor Q11 to the load apparatus 12. The voltage generated at D is fed back to the base of the differential transistor Q6, so that when the transistor Q11 is activated and a voltage VD at D is higher than a voltage VE at E, the transistor Q6 is activated.

Thereby, the transistors Q8 and Q7 are also activated, so that the collector current of the transistor Q7 flows as the holding current to the base of the transistor Q10 by way of the transistor Q9 and the resistor R7. Therefore, the transistors Q10 and Q11 remain activated after the termination of supply of the reset current, so that the supply of the supply voltage VCC to the load apparatus 12 is continued.

However, when the amount of current flowing to the load apparatus 12 increases due to an abnormality such as a short circuit at the load apparatus 12 to decrease the voltage at the collector of the transistor Q11, not to mention when the power is cut off by turning off the power switch SW, the voltage VD generated at D decreases so that the voltage VD is lower than the voltage VE. Consequently, the differential transistor Q6 is disabled.

Thereby, the transistors Q8 and Q7 are also disabled, so that the collector current of the transistor Q7 does not flow to the base of the transistor Q10 by way of the transistor Q9 and the resistor R7. Consequently, the transistors Q10 and Q11 are disabled to stop the power supply to the load apparatus 12.

As described above, when an accident such as a short circuit occurs, since the voltage VD detected by the voltage detecting circuit 2 remains lower than the voltage VE and is never equal to or higher than the voltage VE, the transistor Q11 also remains disabled. However, when the transistor Q11 is disabled not by the accident such as a short circuit but by a rush current generated in charging the decoupling capacitor 9, the activation condition of the transistor Q11 is automatically restored (i.e. the transistor Q11 is automatically activated).

Specifically, when a rush current flows to the capacitor 9, the supply voltage decreases, so that the voltage VD is lower than the voltage VE like the case of a short circuit. Consequently, the transistor Q11 is disabled together with the transistors Q7 to Q10. However, when the transistor Q11 is disabled, a current flows from the power source circuit 1 to the load apparatus 12 through the resistor R to gradually charge the capacitor 9. Consequently, the collector voltage of the transistor Q11 increases so that the voltage VD is equal to or higher than the voltage VE, and the transistors Q7 to Q10 are activated to activate the transistor Q11. Thus, in this case, the power supplying state is automatically restored without any resetting operation. When the transistor Q11 is activated, hardly any current flows to the load apparatus 12 through the resistor 8. This is because the resistance when the transistor Q11 is activated is extremely small compared to the resistor 8.

While the power supply is resumed by turning off the power switch and then turning it on again in this embodiment, for example, when an alternating current power source is used, the power supply may be resumed by pulling out a cord from an outlet and then plugging it in again with the power switch being turned on. Further, while the present invention is employed for the power supply to an external accessory in this embodiment, the present invention is not limited thereto.

As described above, according to the power supplying circuit of the present invention, when the switch means is broken by an accident such as a short circuit at the load apparatus, the supply voltage never increases to a predetermined value or higher, so that the power supply is never resumed until a resetting operation is performed. Thus, protection against abnormal power supply is surely provided. When the switch means is broken by a rush current for charging the decoupling capacitor of the load apparatus, a current flows to the capacitor through the impedance line after the breakage to charge the capacitor, so that the supply voltage increases to the predetermined value or higher and the switch means is automatically brought into the power supplying state by the output of the determining means. Thus, a misoperation which may occur when the power supply is not abnormal is rapidly corrected.

Obviously, many modifications and variations of the present invention are possible in light of the above teachings. It is therefore to be understood that within the scope of the appended claims, the invention may be practiced other than as specifically described.

What is claimed is:

1. A power supplying circuit comprising:

a power source circuit including a power ON/OFF operation means;

determining means for detecting a voltage supplied to a load apparatus and for determining whether or not the voltage is a predetermined potential or lower;

switch means for continuing or cutting off a power supply from the power source circuit to the load apparatus based on a result of the determination by the determining means;

restoring means, connected to said power source circuit and said switch means, for detecting a power ON operation at the power source circuit to restore the switch means which is in a power cutting off state to a power supplying state; and an impedance line connected so as to bypass an input side and an output side of the switch means, said impedance line transmitting a power supply current to the load apparatus when power is cut off by the switch means.

2. A power supplying circuit comprising:

an operation switch connected to a power source;

a reset current generating circuit connected to an output side of the operation switch, said reset current generating circuit generating a pulse-form current when the operation switch is turned on;

a switching transistor of PNP-type having its emitter connected to the output side of the operation switch and having its collector connected to a load apparatus connecting terminal, said switching transistor having its base supplied with the pulse-form current;

a resistor circuit connected between the collector of the switching transistor and a ground potential point;

a first transistor of NPN-type having its base supplied with a potential generated in the resistor circuit;

a second transistor constituting a differential comparator together with the first transistor;

a bias resistor circuit connected between the output side of the operation switch and the ground potential point, said bias resistor circuit supplying a reference voltage to a base of the second transistor when the operation switch is ON;

means for supplying an output of the comparator to the base of the switching transistor; and a resistor connected between the emitter and the collector of the switching transistor in parallel with the switching transistor, said resistor supplying a current to a load apparatus when the switching transistor is OFF.

3. An electronic apparatus to which a load apparatus is attachable, the electronic apparatus comprising:

a power source circuit including a power ON/OFF operation means;

determining means for detecting a voltage supplied to the load apparatus and for determining whether or not the voltage is a predetermined potential or lower;

switch means for continuing or cutting off a power supply from the power source circuit to the load apparatus based on a result of the determination by the determining means;

restoring means, connected to said power source circuit and said switch means, for detecting a power ON operation at the power source circuit to restore the switch means which is in a power cutting off state to a power supplying state; and an impedance line connected so as to bypass an input side and an output side of the switch means, said impedance line transmitting a power supply current to the load apparatus when power is cut off by the switch means.

4. An electronic apparatus to which a load apparatus is attachable, the electronic apparatus comprising:

an operation switch connected to a power source;

a reset current generating circuit connected to an output side of the operation switch, said reset current generating circuit generating a pulse-form current when the operation switch is turned on;

a switching transistor of PNP-type having its emitter connected to the output side of the operation switch and having its collector connected to a load apparatus connecting terminal, said switching transistor having its base supplied with the pulse-form current;

a resistor circuit connected between the collector of the switching transistor and a ground potential point;

a first transistor of NPN-type having its base supplied with a potential generated in the resistor circuit;

a second transistor constituting a differential comparator together with the first transistor;

a bias resistor circuit connected between the output side of the operation switch and the ground potential point, said bias resistor circuit supplying a reference voltage to a base of the second transistor when the operation switch is ON;

means for supplying an output of the comparator to the base of the switching transistor; and a resistor connected between the emitter and the collector of the switching transistor in parallel with the switching transistor, said resistor supplying a current to the load apparatus when the switching transistor is OFF.

* * * * *